(12) United States Patent
Nakamura et al.

(10) Patent No.: US 8,747,089 B2
(45) Date of Patent: Jun. 10, 2014

(54) FLUID MACHINE AND SEAL MEMBER USED FOR THE SAME

(75) Inventors: Yuki Nakamura, Kariya (JP); Kunihito Ando, Okazaki (JP); Nobuhiko Yoshioka, Anjo (JP); Takahiro Naganuma, Kariya (JP); Tomoaki Kawabata, Takahama (JP)

(73) Assignees: Advics Co., Ltd., Kariya, Aichi-Pref. (JP); Denso Corporation, Kariya, Aichi-Pref. (JP)

( * ) Notice: Subject to any disclaimer, the term of this patent is extended or adjusted under 35 U.S.C. 154(b) by 290 days.

(21) Appl. No.: 13/220,003

(22) Filed: Aug. 29, 2011

(65) Prior Publication Data

US 2012/0051959 A1 Mar. 1, 2012

(30) Foreign Application Priority Data

Aug. 31, 2010 (JP) .................. 2010-194639

(51) Int. Cl.
*F04C 15/00* (2006.01)

(52) U.S. Cl.
USPC ........... 418/104; 418/149; 277/628; 277/630; 251/309

(58) Field of Classification Search
USPC ......... 418/104, 112, 125, 126, 127, 132, 149, 418/166; 277/637, 910, 628, 630; 251/277, 251/309, 306
See application file for complete search history.

(56) References Cited

U.S. PATENT DOCUMENTS

| | | | | |
|---|---|---|---|---|
| 2,385,510 | A | * | 9/1945 | Harwood ........................ 251/306 |
| 3,526,385 | A | * | 9/1970 | Rohrer ............................ 251/306 |
| 3,589,667 | A | * | 6/1971 | Lewis et al. .................... 251/211 |
| 3,802,457 | A | * | 4/1974 | Wurzburger ................... 137/327 |
| 3,902,697 | A | * | 9/1975 | Robinson ....................... 251/306 |
| 5,219,149 | A | * | 6/1993 | Combeau ....................... 251/309 |
| 5,456,229 | A | * | 10/1995 | Emmerich ................ 123/195 R |
| 7,516,942 | B2 | * | 4/2009 | Grau et al. ..................... 251/309 |

FOREIGN PATENT DOCUMENTS

JP 2007-125930 A 5/2007

* cited by examiner

*Primary Examiner* — Thai Ba Trieu
*Assistant Examiner* — Thomas Olszewski
(74) *Attorney, Agent, or Firm* — Buchanan Ingersoll & Rooney P.C.

(57) ABSTRACT

An O-ring has a shape including a first portion that is arranged side by side with a suction port in an axial direction, a second portion that is arranged side by side with a suction port, and a third portion that connects these portions. The first portion and the second portion are arranged to be displaced from each other in the axial direction. The third portion is arranged to extend in a direction different from a circumferential direction between the suction port and the suction port when a pump body is viewed in a radial direction. Thus, the suction ports can be located closer to each other in the axial direction. Therefore, the axial direction length of the pump body can be reduced, and size reduction of a rotary pump device can be achieved.

2 Claims, 9 Drawing Sheets

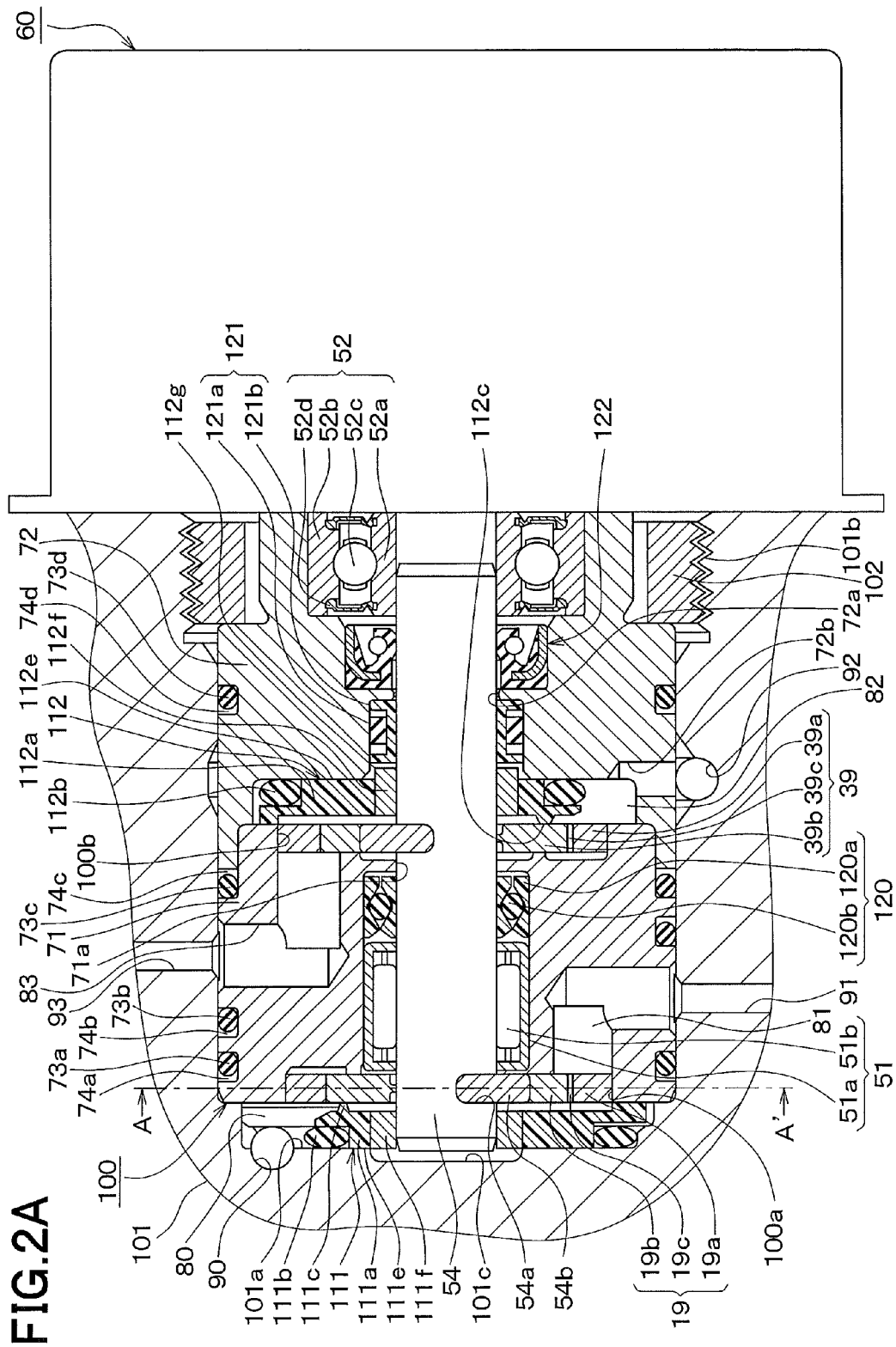

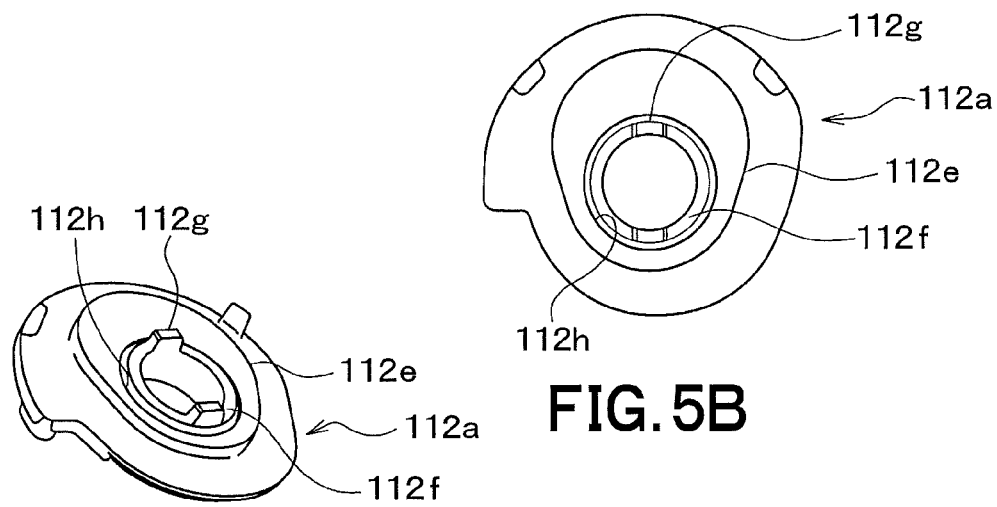
FIG.5B
FIG.5C
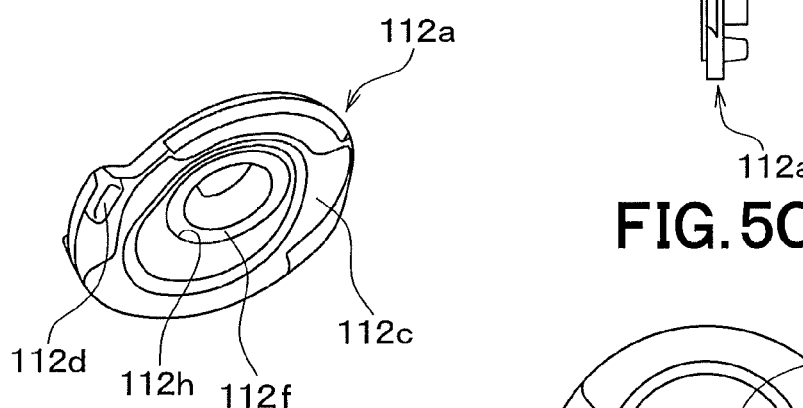
FIG.5E
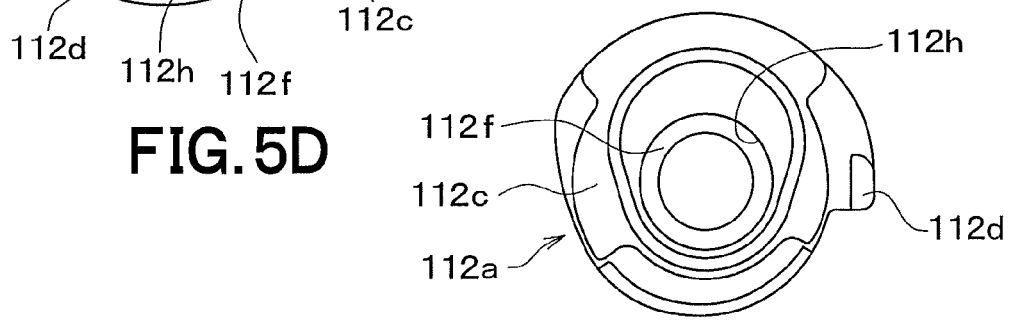
FIG.5D
FIG.5A

FLUID MACHINE AND SEAL MEMBER USED FOR THE SAME

TECHNICAL FIELD

The present invention relates to a fluid machine in which, when a seal target member having at least two openings is arranged in a housing, an annular seal member is used to form a seal between the two openings, and to the annular seal member used for the fluid machine.

BACKGROUND ART

In related art, PTL 1 discloses a brake device having a structure in which a cylinder-shaped pump body that incorporates a rotary pump is inserted into and fixed to a recessed portion of a housing of a brake fluid pressure control actuator. Suction ports and discharge ports for two systems are provided on an outer peripheral surface and a leading end surface of the pump body. In the outer peripheral surface of the pump body, a circular-shaped groove portion is provided between each of the systems and between the suction port and the discharge port of each of the systems. O-rings are arranged in the groove portions to form a seal between each of them. The pump body is inserted into the recessed portion of the housing in a state in which the O-rings are arranged in the groove portions. Thus, the O-rings seal gaps between an inner wall surface of the recessed portion of the housing and the outer peripheral surface of the pump body, thereby forming a seal between each of the systems and between the suction port and the discharge port of each of the systems.

CITATION LIST

Patent Literature

[PTL 1]
Japanese Patent Application Publication No. JP-A-2007-125930

SUMMARY OF INVENTION

Technical Problem

In the case of the structure described in Japanese Patent Application Publication No. JP-A-2007-125930, the suction port and the discharge port of each of the systems provided on the pump body are extended in a circumferential direction centered on a shaft of the rotary pump, taking an assembly error etc. into consideration. Therefore, each of the O-rings is arranged in a circular shape along the circumferential direction. As a result, because the suction port and the discharge port are arranged such that they are displaced from each other in an axial direction, and also because of the presence of the O-ring between them, there is a problem that an arrangement interval with respect to the axial direction becomes longer.

This type of problem is not limited to the brake device etc. that is provided with a rotary pump. Similarly, in a fluid machine that includes a seal target member having at least two openings, it can occur when a seal member is used to form a seal between the two openings.

In light of the foregoing, it is an object of the present invention to provide a fluid machine having a structure that is capable of reducing an axial direction length, and a seal member used for the fluid machine.

Solution to Problem

In order to achieve the above-described object, according to a first aspect of the present invention, there is provided a fluid machine in which an annular seal member is provided in a groove portion formed in an outer peripheral surface of a seal target member, thereby forming a seal between a first opening and a second opening. The first opening and the second opening are arranged to be displaced from each other in a circumferential direction of the cylinder-shaped seal target member, one direction of which is an axial direction. The annular seal member is formed such that it includes a first portion that is arranged side by side with the first opening in the axial direction, a second portion that is arranged side by side with the second opening, and a third portion that connects the first portion and the second portion. The first portion and the second portion are displaced from each other in the axial direction, and the third portion extends in a direction different from the circumferential direction between the first opening and the second opening when the seal target member is viewed in a radial direction.

In this manner, the first portion and the second portion are arranged to be displaced from each other in the axial direction, and the third portion extends between the first opening and the second opening in a direction different from the circumferential direction. Therefore, the first and the second openings can be located closer to each other in the axial direction. Accordingly, it is possible to reduce the axial direction length of the seal target member, and it is possible to reduce the axial direction length of the fluid machine.

According to a second aspect of the present invention, the third portion extends diagonally with respect to the circumferential direction between the first opening and the second opening when the seal target member is viewed in the radial direction.

With this type of structure, the third portion can be easily shortened as compared to a case in which a part of the third portion is arranged to be perpendicular to the circumferential direction and is extended between the first opening and the second opening. As a result, this contributes to a reduction of material that is necessary to form the annular seal member.

According to a third aspect of the present invention, there is provided an annular seal member which is attached between an outer peripheral surface of a circular-shaped first seal target member and an inner wall surface of a recessed portion of a second seal target member. The annular seal member includes: a first through hole that is capable of communicatively connecting a first opening and a third opening in a fluid-tight manner; and a second through hole which is arranged to be displaced from the first through hole in a circumferential direction and which is capable of communicatively connecting a second opening and a fourth opening in a fluid-tight manner.

Since the annular seal member that is provided with the first and the second through holes is used in this manner, the first and the second openings of two systems can be located further closer to each other in the axial direction, and it is possible to achieve further size reduction of a fluid machine in the axial direction. Moreover, with the use of the single annular seal member only, it is possible to demarcate an annular gap between the first seal target member and the second seal target member, to demarcate between one of the demarcated areas, and the first opening and the third opening, and further to demarcate between the other of the demarcated areas, and the second opening and the fourth opening.

As described in a fourth aspect of the present invention, the annular seal member according to the third aspect is arranged, for example, on the outer peripheral surface of the first seal target member of a fluid machine that includes the first seal target member and the second seal target member.

For example, as described in a fifth aspect of the present invention, the fluid machine may be formed such that the first seal target member includes suction paths and discharge paths of two systems, a suction path of one of the two systems is formed by the first opening and the third opening, and a suction path of another of the two systems is formed by the second opening and the fourth opening. In this case, the annular seal member can include a portion which demarcates between the two systems, and the annular seal member can form a seal between the suction path and the discharge path of the one of the two systems such that the suction path of the one of the two systems is arranged in the first through hole and the discharge path of the one of the two systems is arranged outside of the first through hole. Further, the annular seal member can form a seal between the suction path and the discharge path of the other of the two systems such that the suction path of the other of the two systems is arranged in the second through hole and the discharge path of the other of the two systems is arranged outside of the second through hole. Thus, with the use of the single annular seal member only, it is possible to demarcate between the two systems and to demarcate between the suction path and the discharge path of each of the two systems.

Note that the reference numbers in brackets for each of the above-described units are intended to show the relationship with the specific units described in the following embodiments.

BRIEF DESCRIPTION OF DRAWINGS

FIG. 2-b is a cross-sectional diagram of a leading end portion of the pump body 100 in a cross section different from that in FIG. 2-a;

FIG. 5 is a diagram showing a detailed structure of portions of a seal mechanism 112, excluding a rubber member 112b;

DESCRIPTION OF EMBODIMENTS

Figure 1:
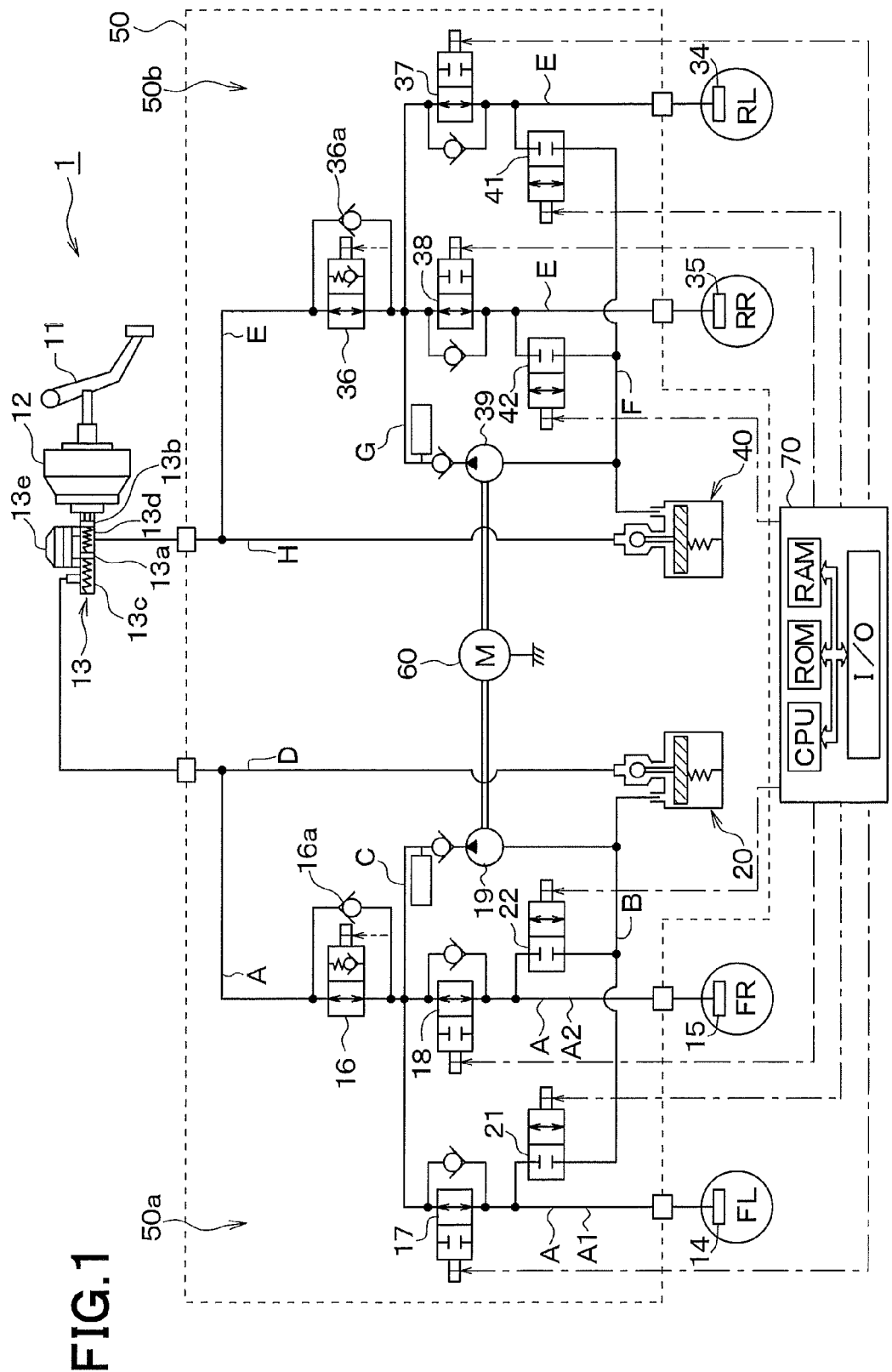
FIG. 1 is a brake piping schematic diagram of a vehicle brake device to which a rotary pump device according to a first embodiment of the present invention is applied.

Hereinafter, embodiments of the present invention will be explained based on the drawings. Note that portions that are the same or equivalent to each other in each of the embodiments that are hereinafter described are assigned the same reference numerals in the drawings.

First Embodiment

Hereinafter, the embodiments of the present invention that are shown in the drawings will be explained. FIG. 1 shows a brake piping schematic diagram of a vehicle brake device to which a rotary pump device according to a first embodiment of the present invention is applied. Hereinafter, a basic structure of the vehicle brake device will be explained based on FIG. 1. Here, an example will be explained in which the vehicle brake device according to the present invention is applied to a front wheel drive four-wheeled vehicle that includes a hydraulic circuit in a front-rear piping arrangement. However, the present invention can also be applied to an X piping arrangement that includes respective piping systems of right front wheel to left rear wheel, and left front wheel to right rear wheel.

As shown in FIG. 1, when a driver depresses a brake pedal 11, which is a brake operating member, the depression force is boosted by a servo unit 12 and pushes master pistons 13a, 13b that are disposed in a master cylinder (hereinafter referred to as an M/C) 13. As a result, a same M/C pressure is generated in a primary chamber 13c and a secondary chamber 13d that are demarcated by the master pistons 13a, 13b. The M/C pressure is transmitted to respective wheel cylinders (hereinafter referred to as W/Cs) 14, 15, 34, 35 via a brake fluid pressure control actuator 50. The M/C 13 is provided with a master reservoir 13e having passages that communicatively connect with, the primary chamber 13c and the secondary chamber 13d, respectively.

The brake fluid pressure control actuator 50 is provided with a first piping system 50a and a second piping system 50b. The first piping system 50a controls the brake fluid pressure applied to a left front wheel FL and a right front wheel FR, while the second piping system 50b controls the brake fluid pressure applied to a right rear wheel RR and a left rear wheel RL.

The first piping system 50a and the second piping system 50b have a same structure. Therefore, hereinafter, the first piping system 50a will be explained and an explanation of the second piping system 50b will be omitted.

The first piping system 50a is provided with a conduit A which transmits the above-described M/C pressure to the W/C 14 provided in the left front wheel FL and to the W/C 15 provided in the right front wheel FR, and which serves as a main conduit that generates a W/C pressure.

The conduit A is provided with a first differential pressure control valve 16 that can be controlled to a communicated state and a differential pressure state. A valve position of the first differential pressure control valve 16 is adjusted such that the first differential pressure control valve 16 is in the communicated state during normal braking (when vehicle motion control is not being performed) when the driver performs an operation of the brake pedal 11. When a current is applied to a solenoid coil provided in the first differential pressure control valve 16, the valve position is adjusted such that, the larger the value of the current is, the larger the differential pressure is.

In a case where the first differential pressure control valve 16 is in the differential pressure state, the brake fluid is allowed to flow from the W/C 14, 15 side to the M/C 13 side only when the brake fluid pressure on the W/C 14, 15 side is higher than the M/C pressure by a predetermined pressure or more. Therefore, the brake fluid pressure on the W/C 14, 15 side is constantly maintained not to become higher than the pressure on the M/C 13 side by the predetermined pressure or more.

The conduit A branches into two conduits A1, A2 on the W/C 14, 15 side, which is downstream of the first differential pressure control valve 16. A first pressure increasing control valve 17, which controls a pressure increase in the brake fluid pressure to the W/C 14, is provided in the conduit A1. A second pressure increasing control valve 18, which controls a pressure increase in the brake fluid pressure to the W/C 15, is provided in the conduit A2.

The first and the second pressure increasing control valves 17, 18 are each formed by a two-position electromagnetic valve that can be controlled between a communicated state and a closed state. More specifically, the first and the second pressure increasing control valves 17, 18 are normally open valves in which, when a control current applied to solenoid coils provided in the first and the second pressure increasing control valves 17, 18 is zero (i.e. when no current is applied), they are brought into the communicated state, and when the control current is allowed to flow to the solenoid coils (i.e., when applying current), they are controlled to the closed state.

A conduit B, serving as a pressure reducing conduit, connects a portion of the conduit A between the first pressure increasing control valve 17 and the W/C 14 with a pressure adjusting reservoir 20, and connects a portion of the conduit A between the second pressure increasing control valve 18 and the W/C 15 with the pressure adjusting reservoir 20. The conduit B is provided with a first pressure reducing control valve 21 and a second pressure reducing control valve 22 that are each formed by a two-position electromagnetic valve that can be controlled between a communicated state and a closed state. The first and the second pressure reducing control valves 21, 22 are normally closed valves.

A conduit C, serving as a reflux conduit, is provided between the pressure adjusting reservoir 20 and the conduit A that is the main conduit. The conduit C is provided with a self-priming rotary pump 19 that is driven by a motor 60 and that sucks the brake fluid from the pressure adjusting reservoir 20 and discharges it to the M/C 13 side or to the W/C 14, 15 side. The motor 60 is driven by controlling current supply to a motor relay, which is not shown in the drawings.

Further, a conduit D, serving as an auxiliary conduit, is provided between the pressure adjusting reservoir 20 and the M/C 13. The brake fluid is sucked by the pump 19 from the M/C 13 through the conduit D and discharged to the conduit A. As a result, the brake fluid is supplied to the W/C 14, 15 side during vehicle motion control, and the W/C pressure of a target wheel is thereby increased. Note that, although the first piping system 50a is explained here, the second piping system 50b also has a similar structure, and the second piping system 50b is also provided with structural elements that are similar to those provided in the first piping system 50a. Specifically, the second piping system 50b is provided with a second differential pressure control valve 36 that corresponds to the first differential pressure control valve 16, third and fourth pressure increasing control valves 37, 38 that correspond to the first and the second pressure increasing control valves 17, 18, third and fourth pressure reducing control valves 41, 42 that correspond to the first and the second pressure reducing control valves 21, 22, a pump 39 that corresponds to the pump 19, a reservoir 40 that corresponds to the reservoir 20, and conduits E to H that correspond to the conduits A to D.

A brake ECU 70 corresponds to a vehicle motion control device of the present invention that controls a control system of a brake control system 1, and is a known microcomputer that is provided with a CPU, a ROM, a RAM, an I/O port and the like. The brake ECU 70 performs processing, such as various types of calculation, according to programs stored in the ROM and the like, thus performing vehicle motion control such as antiskid control etc. More specifically, the brake ECU 70 calculates various types of physical quantities based on detection by sensors that are not shown in the drawings, and based on the calculation results, the brake ECU 70 determines whether or not to perform vehicle motion control. When the vehicle motion control is performed, the brake ECU 70 calculates a control amount for a control target wheel, namely, a W/C pressure to be generated at the W/C of the control target wheel. Based on a result of the calculation, the brake ECU 70 controls the supply of current to each of the control valves 16 to 18, 21, 22, 36 to 38, 41 and 42, and also controls the amount of current supplied to the motor 60 to drive the pumps 19, 39. Thus, the W/C pressure of the control target wheel is controlled and the vehicle motion control is performed.

When no pressure is generated at the M/C 13 as in traction control or antiskid control, for example, the pumps 19, 39 are driven, and at the same time, the first and the second differential pressure valves 16, 36 are brought into a differential state. Thus, the brake fluid is supplied through the conduits D, H to the downstream side of the first and the second differential pressure control valves 16, 36, namely, to the W/C 14, 15, 34, 35 side. Then, increase/decrease of the W/C pressure of the control target wheel is controlled by appropriately controlling the first to the fourth pressure increasing control valves 17, 18, 37, 38 or the first to the fourth pressure reducing control valves 21, 22, 41, 42. Thus, the W/C pressure is controlled to become a desired control amount.

Further, during antiskid (ABS) control, the first to the fourth pressure increasing control valves 17, 18, 37, 38 or the first to the fourth pressure reducing control valves 21, 22, 41, 42 are appropriately controlled, and at the same time, the pumps 19, 39 are driven. Thus, the increase/decrease of the W/C pressure is controlled, and the W/C pressure is controlled to become the desired control amount.

Figure 2B:
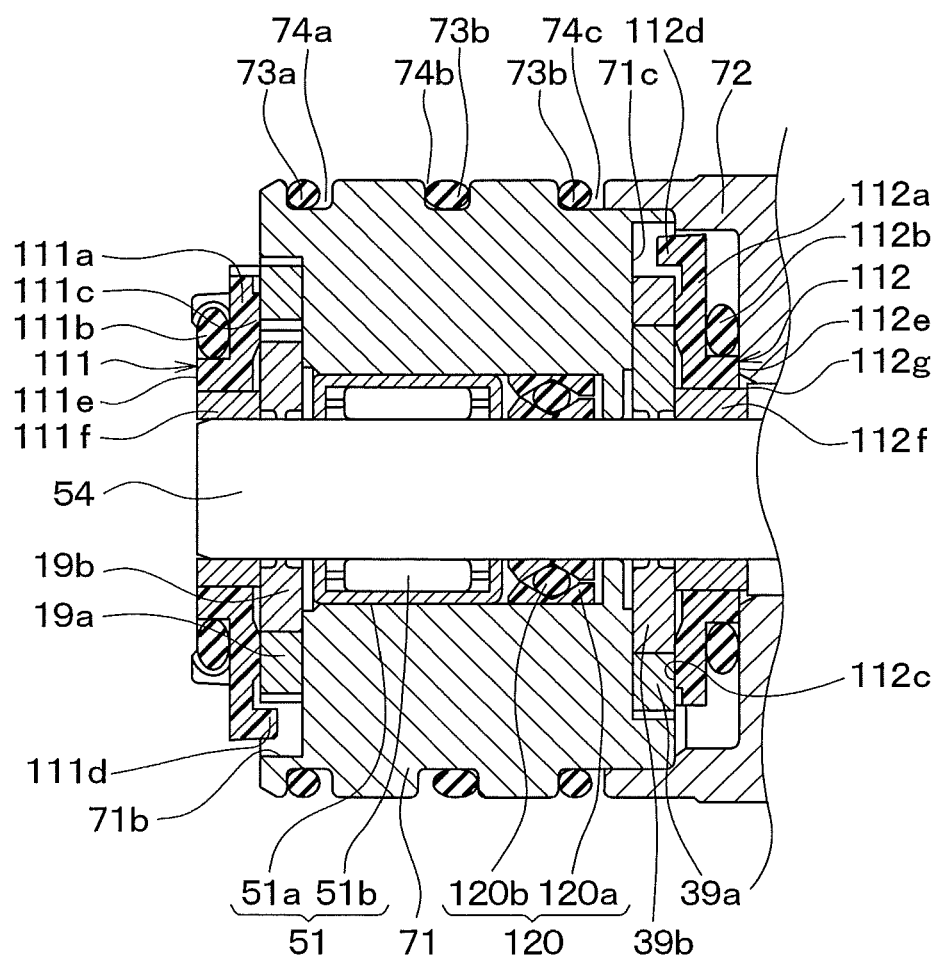
FIG. 2-a is a cross-sectional diagram of the rotary pump device that is provided with a pump body 100 including rotary pumps 19, 39, and with a motor 60.

Next, a detailed structure of the rotary pump device in the vehicle brake device structured as described above will be explained. FIG. 2-a is a cross-sectional diagram of the rotary pump device that is provided with a pump body 100 including the rotary pumps 19, 39, and with the motor 60. FIG. 2-a shows a state in which the pump body 100 is assembled into a housing 101 of the brake fluid pressure control actuator 50, and the pump body 100 is assembled such that an up-down direction of the drawing is a vehicle vertical direction. FIG. 2-b is a cross-sectional diagram of a leading end portion of the pump body 100 in a cross section different from that in FIG. 2-a. FIG. 2-b corresponds to a drawing when the pump body 100 is cut at a cross section perpendicular to FIG. 2-a, along a central axis of the pump body 100.

As described above, the vehicle brake device is formed by the two systems, i.e., the first piping system and the second piping system. Therefore, the pump body 100 is provided with two pumps, i.e., the rotary pump 19 for the first piping system and the rotary pump 39 for the second piping system.

The rotary pumps 19, 39 that are incorporated in the pump body 100 are driven by the motor 60 rotating a drive shaft 54 that is supported by a first bearing 51 and a second bearing 52. A casing that forms an outer shape of the pump body 100 is formed by a cylinder 71 made of aluminum and a plug 72. The first bearing 51 is arranged in the cylinder 71 and the second bearing 52 is arranged in the plug 72.

The cylinder 71 and the plug 72 are integrated such that one end side of the cylinder 71 is press fitted into the plug 72 in a state in which the cylinder 71 and the plug 72 are coaxially arranged, thus forming the casing of the pump body 100. Further, the rotary pumps 19, 39, various types of seal members and the like are provided along with the cylinder 71 and the plug 72, thus forming the pump body 100.

The pump body 100 having an integrated structure is formed in this manner. The pump body 100 with the integrated structure is inserted into a recessed portion 101a from the right side of the drawing. The recessed portion 101*a* has a substantially cylindrical shape and is formed in the housing 101 made of aluminum. Then, a ring-shaped male screw member (screw) 102 is screwed into a female screw groove 101*b* that is formed in an entrance of the recessed portion 101*a*, thus fixing the pump 100 to the housing 101. Since the male screw member 102 is screwed, the pump body 100 is inhibited from being pulled out from the housing 101.

A direction in which the pump body 100 is inserted into the recessed portion 101*a* of the housing 101 is hereinafter simply referred to as an insertion direction. Further, an axial direction and a circumferential direction of the pump body 100 (an axial direction and a circumferential direction of the drive shaft 54) are hereinafter simply referred to as an axial direction and a circumferential direction.

Further, a circular-shaped second recessed portion 101*c* is formed in the recessed portion 101*a* of the housing 101, at a leading end position in the insertion direction, more specifically, at a position corresponding to a leading end of the drive shaft 54. The diameter of the second recessed portion 101*c* is made larger than the diameter of the drive shaft 54 and the leading end of the drive shaft 54 is located in the second recessed portion 101*c* so that the drive shaft 54 does not come into contact with the housing 101.

The cylinder 71 and the plug 72 are provided with center holes 71*a*, 72*a*, respectively. The drive shaft 54 is inserted into the center holes 71*a*, 72*a*, and is supported by the first bearing 51 that is fixed to an inner periphery of the center hole 72*a* formed in the cylinder 71, and by the second bearing 52 that is fixed to an inner periphery of the center hole 72*a* formed in the plug 72. Although bearings with any structure may be used as the first and the second bearing 51, 52, rolling bearings are used in the present embodiment.

Specifically, the first bearing 51 is a needle roller bearing without inner ring, and is provided with an outer ring 51*a* and a needle-shaped roller 51*b*. The drive shaft 54 is axially supported by being fitted into a hole of the first bearing 51. The diameter of the center hole 71*a* of the cylinder 71 is enlarged, at a forward portion in the insertion direction of the center hole 71*a*, to have a dimension corresponding to the outer diameter of the first bearing 51. Therefore, the first bearing 51 is fixed to the cylinder 71 by being press fitted into this enlarged diameter portion.

The second bearing 52 is structured such that it includes an inner ring 52*a*, an outer ring 52*b* and a rolling element 52*c*, and it is fixed by the outer ring 52*b* being press fitted into the center hole 72*a* of the plug 72. The drive shaft 54 is fitted into a hole in the inner ring 52*a* of the second bearing 52, and thus the drive shaft 54 is axially supported.

Figure 3:
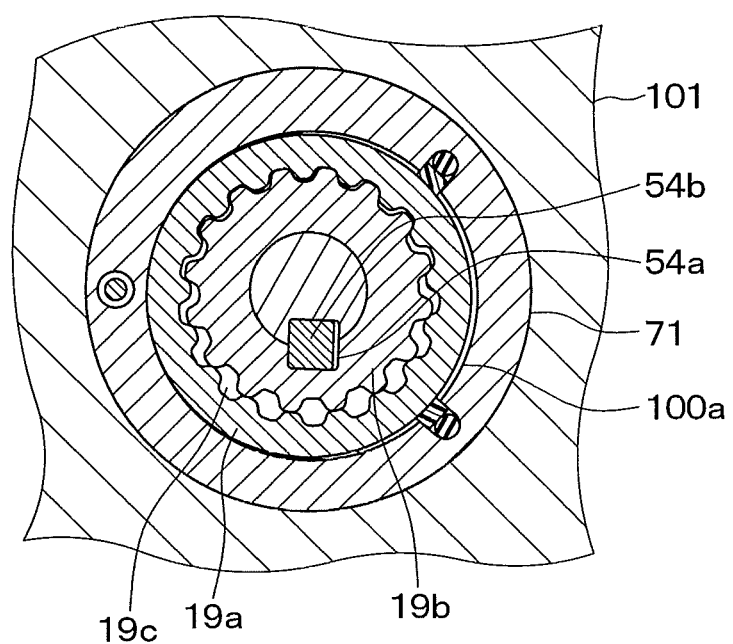
FIG. 3 is an A-A cross-sectional diagram of FIG. 2-a.
Figure 4B:
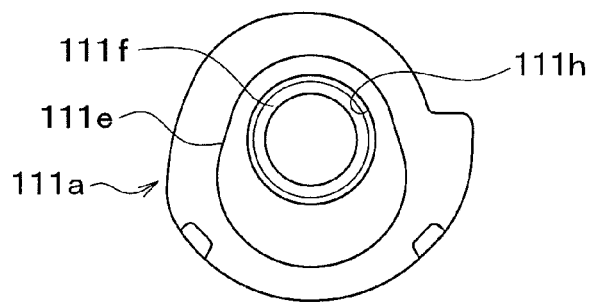
FIG. 4 is a diagram showing a detailed structure of portions of a seal mechanism 111, excluding a rubber member 111b.
Figure 4E:
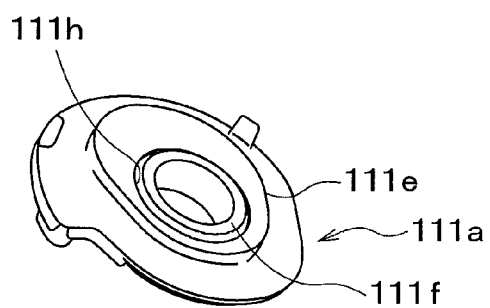
Figure 4C:
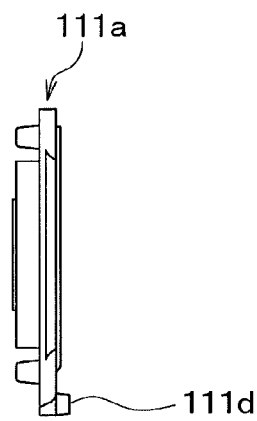
Figure 4D:
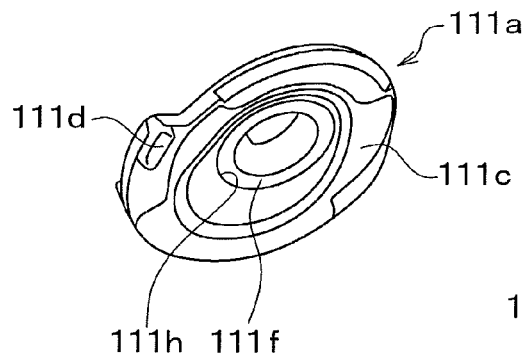
Figure 4A:
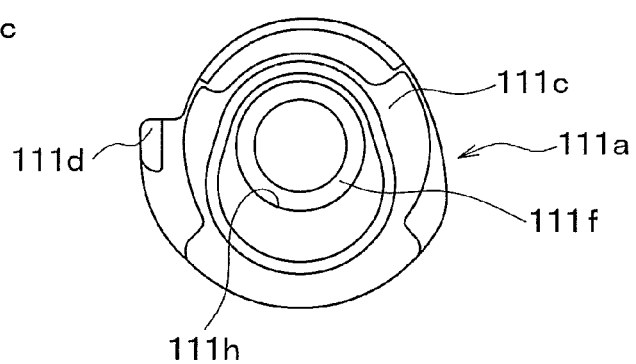

The rotary pumps 19, 39 are respectively provided on both sides of the first bearing 51, namely, in an area located further forward in the insertion direction than the first bearing 51, and an area sandwiched by the first and the second bearings 51, 52. Detailed structures of the rotary pumps 19, 39 will be explained with reference to FIG. 3, which shows an A-A cross-sectional diagram of FIG. 2-*a*.

The rotary pump 19 is arranged in a rotor chamber 100*a*, which is a circular-shaped recessed counterbore formed in one end face of the cylinder 71. The rotary pump 19 is an internal gear pump (a trochoid pump), which is driven by the drive shaft 54 that is inserted into the rotor chamber 100*a*.

Specifically, the rotary pump 19 is provided with a rotating portion that is formed by: an outer rotor 19*a* having an inner periphery on which an inner teeth portion is formed; and an inner rotor 19*b* having an outer periphery on which an outer teeth portion is formed. The drive shaft 54 is inserted into a hole formed in the center of the inner rotor 19*b*. A key 54*b* is fittingly inserted into a hole 54*a* formed in the drive shaft 54, and a torque is transmitted to the inner rotor 19*b* by the key 54*b*.

The inner teeth portion and the outer teeth portion that are respectively formed on the outer rotor 19*a* and the inner rotor 19*b* are engaged with each other, and a plurality of void portions 19*c* are thereby formed. Sizes of the void portions 19*c* are changed by rotation of the drive shaft 54, and thus the brake fluid is sucked and discharged.

On the other hand, the rotary pump 39 is arranged in a rotor chamber 100*b*, which is a circular-shaped recessed counterbore formed in the other end face of the cylinder 71, and the rotary pump 39 is driven by the drive shaft 54 that is inserted into the rotor chamber 100*b*. Similarly to the rotary pump 19, the rotary pump 39 is also an internal gear pump that is provided with an outer rotor 39*a* and an inner rotor 39*b*, and sucks and discharges the brake fluid using a plurality of void portions 39*c* that are formed by two teeth portions of the outer rotor 39*a* and the inner rotor 39*b* being engaged with each other. The rotary pump 39 is arranged such that the rotary pump 19 is rotated by approximately 180 degrees centered on the drive shaft 54. With this type of arrangement, the suction-side void portions 19*c*, 39*c* and the discharge-side void portions 19*c*, 39*c* of the respective rotary pumps 19, 39 are symmetrically positioned with the drive shaft 54 as a center. Thus, it is possible to cancel out forces applied to the drive shaft 54 by a high-pressure brake fluid on the discharge side.

A seal mechanism 111 that presses the rotary pump 19 to the cylinder 71 side is provided on the one end face side of the cylinder 71, on an opposite side to the cylinder 71 with respect to the rotary pump 19, namely, between the cylinder 71 and the rotary pump 19, and the housing 101. Further, a seal mechanism 112 that presses the rotary pump 39 to the cylinder 71 side is provided on the other end face side of the cylinder 71, on an opposite side to the cylinder 71 with respect to the rotary pump 39, namely, between the cylinder 71 and the rotary pump 39, and the plug 72.

The seal mechanism 111 is formed by a ring-shaped member having a center hole into which the drive shaft 54 is inserted, and forms a seal between a relatively low-pressure section and a relatively high-pressure section on the one end face side of the rotary pump 19, by pressing the outer rotor 19*a* and the inner rotor 19*b* to the cylinder 71 side. Specifically, the seal mechanism 111 is formed to include a hollow plate-shaped resin member 111*a* that is arranged on the rotating portion side, and a rubber member 111*b* that presses the resin member 111*a* to the rotating portion side.

FIG. 4 is a diagram showing a detailed structure of the seal mechanism 111 (in which the annular rubber member 111*b* is removed), (a) is a diagram of the seal mechanism 111 as viewed from the right side of FIG. 2-*a*, (b) is a diagram of the seal mechanism 111 as viewed from the left side of FIG. 2-*a*, (c) is a diagram of the seal mechanism 111 as viewed from the upper side of FIG. 2-*a*, (d) is a perspective diagram of the seal mechanism 111, and (e) is a perspective diagram of the seal mechanism 111 as viewed from a direction different from that in (d).

As shown in FIG. 4, the resin member 111*a* is provided with an annular seal surface 111*c* that is partially protruded to the rotary pump 19 side. The suction-side void portions 19*c* and a gap between the cylinder 71 and an outer periphery of the outer rotor 19*a* that faces the suction-side void portions 19*c* are located on an inner peripheral side of the annular seal surface 111*c*. The discharge-side void portions 19*c* and a gap between the cylinder 71 and the outer periphery of the outer rotor 19*a* that faces the discharge-side void portions 19*c* are located on an outer peripheral side of the seal surface 111*c*. In other words, the sealing between a relatively low-pressure section and a relatively high-pressure section on the inner and outer peripheries of the seal mechanism 111 is performed by the seal surface 111c.

The resin member 111a is not formed in a circular shape, but is formed in a shape whose radial dimension from the drive shaft 54 gradually increases from the upper side to the lower side of the drawing. Further, the resin member 111a is provided with a projecting anti-rotation portion 111d. As shown in FIG. 2-b, a recessed portion 71b is formed in a position of the cylinder 71 that corresponds to the anti-rotation portion 111d. The anti-rotation portion 111d is fitted into the recessed portion 71b, and thus the resin member 111a can be inhibited from rotating in accordance with rotation of the drive shaft 54.

The inner peripheral side of a forward surface in the insertion direction of the resin member 111a is formed as a convex portion 111e that is protruded in the opposite direction to the rotary pump 19 in the axial direction. The annular rubber member 111b is arranged to surround the outer periphery of the convex portion 111e.

The annular rubber member 111b is formed by an O-ring, for example. The diameter of the cross section when the annular rubber member 111b is cut in the radial direction is set to be larger than an amount of protrusion of the convex portion 111e. Therefore, the annular rubber member 111b is compressed between the resin member 111a and the bottom of the recessed portion 101a of the housing 101, and the seal surface 111c of the resin member 111a is brought into contact with the rotary pump 19 by a restoring force of the annular rubber member 111b. With this type of structure, the above-described sealing by the seal surface 111c is achieved. Further, since the annular rubber member 111b comes into contact with the bottom of the recessed portion 101a of the housing 101, sealing is also achieved between the outer peripheral side and the inner peripheral side of the annular rubber member 111b, namely, between a high-pressure discharge port 80 side and the low-pressure drive shaft 54 side.

Outer diameters of the resin member 111a and the annular rubber member 111b are made smaller than an inner diameter of the recessed portion 101a of the housing 101, at least on the upper side of the drawing. Therefore, the brake fluid can flow through a gap between the recessed portion 101a of the housing 101, and the resin member 111a and the annular rubber member 111b on the upper side of the drawing. This gap forms the discharge port 80 and is connected to a discharge conduit 90 that is formed in the bottom of the recessed portion 101a of the housing 101. With this type of structure, the rotary pump 19 can discharge the brake fluid using the discharge port 80 and the discharge conduit 90 as a discharge path.

The inner peripheral side of the seal mechanism 111, namely, a section of the center hole that comes into contact with the drive shaft 54, is formed by a metal ring 111f. The metal ring 111f is integrally formed with the resin member 111a, or has an integrated structure with the resin member 111a by the resin member 111a being press fitted into a hollow portion 111h. The resin member 111a is arranged with a minimum clearance with respect to the drive shaft 54 so that the resin member 111a is in sliding contact with the drive shaft 54. Since the metal ring 111f is provided, the resin member 111a is inhibited from directly coming into contact with the drive shaft 54. As a result, even if the resin member 111a is deformed by the brake fluid pressure generated by the rotary pump 19, it is possible to inhibit tightening against the drive shaft 54 by the resin member 111a due to the deformation, namely, the occurrence of sticking by the resin member 111a.

A suction port 81, which communicates with the void portions 19c on the suction side of the rotary pump 19, is formed on the cylinder 71. The suction port 81 is extended from the end face of the cylinder 71 on the rotary pump 19 side to reach an outer peripheral surface of the cylinder 71, and is connected to a suction conduit 91 that is provided on a side surface of the recessed portion 101a of the housing 101. With this type of structure, the rotary pump 19 can introduce the brake fluid using the suction conduit 91 and the suction port 81 as a suction path.

On the other hand, the seal mechanism 112 is also formed by a ring-shaped member having a center hole into which the drive shaft 54 is inserted, and forms a seal between a relatively low-pressure section and a relatively high-pressure section on one end face side of the rotary pump 39, by pressing the outer rotor 39a and the inner rotor 39b to the cylinder 71 side. Specifically, the seal mechanism 112 is formed to include a hollow plate-shaped resin member 112a that is arranged on the rotating portion side, and a rubber member 112b that presses the resin member 112a to the rotating portion side.

FIG. 5 is a diagram showing a detailed structure of the seal mechanism 112 (in which the annular rubber member 112b is removed), (a) is a diagram of the seal mechanism 112 as viewed from the left side of FIG. 2-a, (b) is a diagram of the seal mechanism 112 as viewed from the right side of FIG. 2-a, (c) is a diagram of the seal mechanism 112 as viewed from the upper side of FIG. 2-a, (d) is a perspective diagram of the seal mechanism 112, and (e) is a perspective diagram of the seal mechanism 112 as viewed from a direction different from that in (d).

As shown in FIG. 5, the resin member 112a is provided with an annular seal surface 112c that is partially protruded to the rotary pump 39 side. The suction-side void portions 39c and a gap between the cylinder 71 and the outer periphery of the outer rotor 39a that faces the suction-side void portions 39c are located on an inner peripheral side of the annular seal surface 112c. The discharge-side void portions 39c and a gap between the cylinder 71 and the outer periphery of the outer rotor 39a that faces the discharge-side void portions 39c are located on an outer peripheral side of the seal surface 112c. In other words, the sealing between a relatively low-pressure section and a relatively high-pressure section on the inner and outer peripheries of the seal mechanism 112 is performed by the seal surface 112c.

The resin member 112a is not formed in a circular shape, but is formed in a shape whose radial dimension from the drive shaft 54 gradually reduces from the upper side to the lower side of the drawing. Further, the resin member 112a is provided with a projecting anti-rotation portion 112d. As shown in FIG. 2-b, a recessed portion 71c is formed in a position of the cylinder 71 that corresponds to the anti-rotation portion 112d. The anti-rotation portion 112d is fitted into the recessed portion 71c, and thus the resin member 112a can be inhibited from rotating in accordance with rotation of the drive shaft 54.

The inner peripheral side of a rearward surface in the insertion direction of the resin member 112a is formed as a convex portion 112e that is protruded in the opposite direction to the rotary pump 39 in the axial direction. The annular rubber member 112b is arranged to surround the outer periphery of the convex portion 112e.

The annular rubber member 112b is formed by an O-ring, for example. The diameter of the cross section when the annular rubber member 112b is cut in the radial direction is set to be larger than an amount of protrusion of the convex portion 112e. Therefore, the annular rubber member 112b is compressed between the resin member 112a and the plug 72, and the seal surface 112c of the resin member 112a is brought into contact with the rotary pump 39 by a restoring force of the annular rubber member 112b. With this type of structure, the above-described sealing by the seal surface 112c is achieved. Further, since the annular rubber member 112b comes into contact with a recessed portion of the plug 72, sealing is also achieved between the outer peripheral side and the inner peripheral side of the annular rubber member 112b, namely, between a high-pressure discharge port 82 side and the low-pressure drive shaft 54 side.

Outer diameters of the resin member 112a and the annular rubber member 112b are made smaller than an inner diameter of the plug 72, at least on the lower side of the drawing. Therefore, the brake fluid can flow through a gap between the plug 72, and the resin member 112a and the annular rubber member 112b on the lower side of the drawing. This gap forms the discharge port 82, and is connected to a communication passage 72b formed in the plug 72 and a discharge conduit 92 formed in a side surface of the recessed portion 101a of the housing 101. With this type of structure, the rotary pump 39 can discharge the brake fluid using, as a discharge path, the discharge port 82, the communication passage 72b and the discharge conduit 92.

The inner peripheral side of the seal mechanism 112, namely, a section of the center hole that comes into contact with the drive shaft 54 is formed by a metal ring 112f. The metal ring 112f is integrally formed with the resin member 112a, or has an integrated structure with the resin member 112a by the resin member 112a being press fitted into a hollow portion 112h. Since the metal ring 112f is provided, the resin member 112a is inhibited from coming into contact with the drive shaft 54. As a result, even if the resin member 112a is deformed by the brake fluid pressure generated by the rotary pump 39, it is possible to inhibit tightening against the drive shaft 54 by the resin member 112a due to the deformation, namely, the occurrence of sticking by the resin member 112a.

On the other hand, an end face of the cylinder 71 on the rotary pumps 19, 39 side is also used as a seal surface, and the rotary pumps 19, 39 are firmly attached to the seal surface, thereby forming a mechanical seal. Thus, a relatively low-pressure section and a relatively high-pressure section on the other end face side of the rotary pumps 19, 39 are sealed.

A suction port 83, which communicates with the void portions 39c on the suction side of the rotary pump 39, is formed on the cylinder 71. The suction port 83 is extended from the end face of the cylinder 71 on the rotary pump 39 side to reach the outer peripheral surface of the cylinder 71, and is connected to a suction conduit 93 that is provided on a side surface of the recessed portion 101a of the housing 101. With this type of structure, the rotary pump 39 can introduce the brake fluid using the suction conduit 93 and the suction port 83 as a suction path.

Note that, in FIG. 2-a, the suction conduit 91 and the discharge conduit 90 correspond to the conduit C in FIG. 1, and the suction conduit 93 and the discharge conduit 92 correspond to the conduit G in FIG. 1.

A sealing member 120 is housed in the center hole 71a of the cylinder 71, at a position rearward of the first bearing 51 in the insertion direction. The sealing member 120 is formed by an annular resin member 120a having a U-shaped cross section in the radial direction, and an annular rubber member 120b that is fitted into the annular resin member 120a. In the seal member 120, the annular resin member 120a is pressed and compressed by the cylinder 71 and the drive shaft 54, and the annular rubber member 120a is thereby compressed. The annular resin member 120a comes into contact with the cylinder 71 and the drive shaft 54 by an elastic reaction force of the annular rubber member 120b, thereby forming a seal between them. As a result, sealing between the two systems is achieved inside the center hole 71a of the cylinder 71.

Further, the center hole 72a of the plug 72 has a stepped shape in which the inner diameter is changed in three steps from the front to the rear in the insertion direction, and a seal member 121 is housed in a first stepped portion that is located on the rearmost side in the insertion direction. The seal member 121 is made by fitting a ring-shaped elastic ring 121a, which is made of an elastic member such as rubber, into a ring-shaped resin member 121b, in which a groove portion is formed such that its radial direction is taken as the depth direction. Due to an elastic force of the elastic ring 121a, the resin member 121b is pressed and comes into contact with the drive shaft 54.

Figure 6:
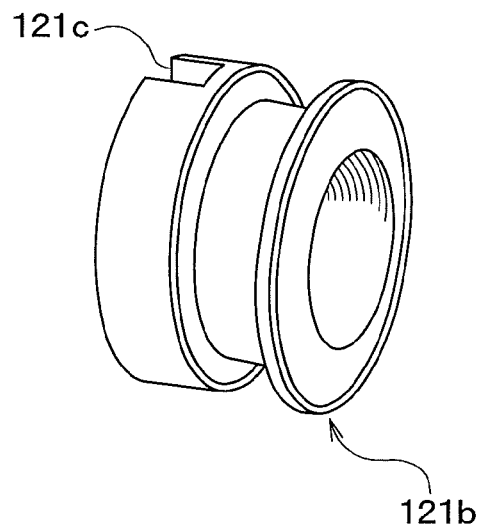
FIG. 6 is a perspective diagram of a resin member 121b of a seal member 121.

FIG. 6 is a perspective diagram of the resin member 121b of the seal member 121. As shown in FIG. 6, a slit 121c is formed on the seal mechanism 112 side of the resin member 121b. A protruding portion 112g of a metal ring 112f provided in the seal mechanism 112 is fitted into the slit 121c. As a result, the seal member 121 and the seal mechanism 112 are engaged with each other, which restricts the rotation of the seal member 121 along with the rotation of the drive shaft 54.

Note that the above-described seal mechanism 112 is housed in a second stepped portion, which corresponds to a step of the center hole 72a that is adjacent to the step on which the seal member 121 is arranged. The above-described communication passage 72b is formed from the second stepped portion to reach the outer peripheral surface of the plug 72. Further, a rear end of the cylinder 71 in the insertion direction is press fitted into a third stepped portion that is located on the frontmost side of the center hole 72a in the insertion direction. A portion of the cylinder 71 that is fitted into the center hole 72a of the plug 72 has a reduced outer diameter compared to the other portions of the cylinder 71. An axial direction dimension of the portion of the cylinder 71 that has the reduced outer diameter is made larger than an axial direction dimension of the third stepped portion of the center hole 72a. Therefore, when the cylinder 71 is press fitted into the center hole 72a of the plug 72, a groove portion 74c is formed by the cylinder 71 and the plug 72, at a leading end position of the plug 72.

The diameter of the center hole 72a of the plug 72 is partially enlarged also at the rear side in the insertion direction, and an oil seal (a seal member) 122 is provided on this enlarged portion. In this manner, since the oil seal 122 is arranged closer to the motor 60 than the seal member 121, leakage of the brake fluid to the outside through the center hole 72c is basically inhibited by the seal member 121, and an effect thereof is more reliably obtained by the oil seal 122.

On the outer periphery of the pump body 100 that is structured in this manner, O-rings 73a to 73d, which are annular seal members, are provided to perform sealing between respective portions. The O-rings 73a to 73d are used to seal the brake fluid between the two systems formed in the housing 101, and between the discharge path and the suction path of each of the two systems. The O-ring 73a is arranged between a section including the discharge port 80 and the discharge conduit 90 and a section including the suction port 81 and the suction conduit 91. The O-ring 73b is arranged between the section including the suction port 81 and the suction conduit 91 and a section including the suction port 83 and the suction conduit 93. The O-ring 73c is arranged between the section including the suction port 83 and the suction conduit 93 and a section including the discharge port 82 and the discharge conduit 92. The O-ring 73d is arranged between the section including the discharge port 82 and the discharge conduit 92 and the outside of the housing 101. Here, the O-rings 73a, 73c, 73d are each simply arranged in a circular shape such that they surround the outer periphery centered on the drive shaft 54, while the O-ring 73b is arranged to be displaced in the axial direction although it surrounds the outer periphery centered on the drive shaft 54. Detailed structures will be described with reference to FIG. 7.

Figure 7:
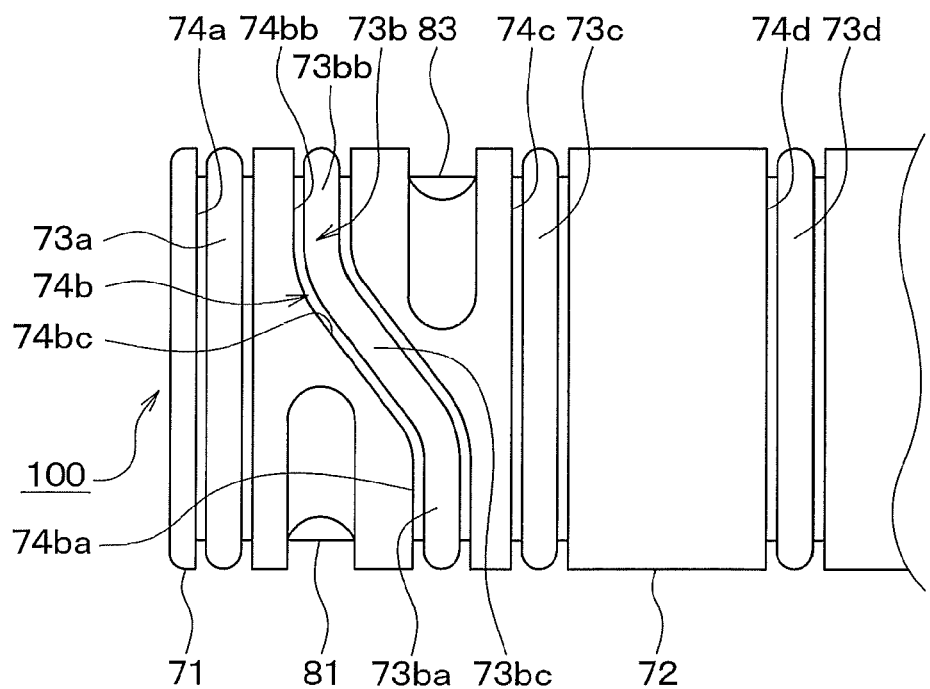
FIG. 7 is a diagram showing portions of the pump body 100, in which O-rings 73a to 73d are arranged.

FIG. 7 is a diagram showing portions of the pump body 100, in which the O-rings 73a to 73d are arranged. As shown in FIG. 7, the outer periphery of the pump body 100 is provided with groove portions 74a to 74d in which the O-rings 73a to 73d are arranged. The groove portions 74a, 74b are formed by partially recessing the outer periphery of the cylinder 71. The groove portion 74c is formed by a recessed portion in the outer periphery of the cylinder 71 and a leading end portion of the plug 72. The groove portion 74d is formed by partially recessing the outer periphery of the plug 72.

The groove portions 74a, 74c, 74d are each provided in a circular shape centered on the central axis of the pump body 100 (the central axis of the drive shaft 54). Therefore, the O-rings 73a, 73c, 73d that are respectively provided in the groove portions 74a, 74c, 74d also have a circular shape.

In contrast to the above, the groove portion 74b is arranged to be displaced in the axial direction although it surrounds the outer periphery centered on the drive shaft 54. The suction ports 81, 83 are arranged on the outer periphery of the pump body 100 such that they are displaced from each other in the circumferential direction of the pump body 100. However, the groove portion 74b is structured such that it includes a first portion 74ba that is arranged side by side with the suction port 81 in the axial direction, a second portion 74bb that is arranged side by side with the suction port 83, and a third portion 74bc that connects these portions. The first portion 74ba and the second portion 74bb are arranged to be displaced from each other in the axial direction. When the pump body 100 is viewed in the radial direction, the third portion 74bc is extended between the suction port 81 and the suction port 83 in a direction different from the circumferential direction, more specifically, it is extended diagonally with respect to the circumferential direction. Accordingly, the O-ring 73b that is arranged in the groove portion 74b structured in this manner also has a shape that includes a first portion 73ba that is arranged side by side with the suction port 81 in the axial direction, a second portion 73bb that is arranged side by side with the suction port 83, and a third portion 73bc that connects these portions. The first portion 73ba and the second portion 73bb are arranged to be displaced from each other in the axial direction. When the pump body 100 is viewed in the radial direction, the third portion 73bc is extended between the suction port 81 and the suction port 83 in a direction different from the circumferential direction, more specifically, it is extended diagonally. The O-ring 73b structured in this manner may be an O-ring that is formed in advance to have a similar shape to that of the groove portion 74b. However, it may have a circular shape similarly to the other O-rings 73a, 73c, 73d. More specifically, the O-ring 73b may be fitted into the groove portion 74b by elastically deforming the O-ring 73b so that the O-ring 73b takes the shape of the groove portion 74b.

Note that the suction ports 81, 83 are extended in the circumferential direction with respect to the cylinder 71 as shown in FIG. 7. Since they are extended in this manner, displacement between the suction ports 81, 83 and the suction conduits 91, 93 is inhibited when the pump body 100 is assembled into the recessed portion 101a of the housing 101. At the same time, an accumulated amount of the brake fluid is increased along with an increase in volume of the suction paths. Since the volume of the suction paths is increased in this manner, when the brake fluid is sucked, it is possible to inhibit the rotary pumps 19, 39 from being unable to suck the brake fluid due to insufficient brake fluid.

Further, the diameter of the outer peripheral surface of the plug 72 is reduced at the rear side in the insertion direction, and a stepped portion is thereby formed. The above-described ring-shaped male screw member 102 is fitted into this reduced diameter portion, and the pump body 100 is thereby fixed.

The rotary pump device is structured as described above. In the rotary pump device structured in this way, the incorporated rotary pumps 19, 39 perform a pump operation of suction/discharge of the brake fluid in response to the drive shaft 54 being rotated by a rotation axis of the motor 60. As a result, vehicle motion control, such as antiskid control, is performed by the vehicle brake device.

In the rotary pump device, when the rotary pump device performs the pump operation, the discharge pressure of the rotary pumps 19, 39 is introduced to portions of the resin members 111a, 112a that are located on an opposite side to the rotary pumps 19, 39, the resin members 111a, 112a being provided in the two seal mechanisms 111, 112. Therefore, a high discharge pressure is applied to the two seal mechanisms 111, 112 in a direction to pressurize them from the outside of the cylinder 71, and the seal surfaces 111c, 112c of the two seal mechanisms 111, 112 are pressed against the rotary pumps 19, 39 while the other end faces in the axial direction of the rotary pumps 19, 39 are pressed against the cylinder 71. As a result, while the one end faces in the axial direction of the rotary pumps 19, 39 are sealed by the two seal mechanisms 111, 112, the other end faces in the axial direction of the rotary pumps 19, 39 can be mechanically sealed by the cylinder 71.

In this manner, the two seal mechanisms 111, 112 are structured such that they are pressed from the outside of the cylinder 71 at a discharge pressure. Therefore, the both end faces of the rotary pumps 19, 39 can be sealed without requiring a member that generates an axial force to mechanically press the seal mechanisms 111, 112.

In this type of rotary pump device, in the present embodiment, the O-ring 73b has the shape that includes the first portion 73ba that is arranged side by side with the suction port 81 in the axial direction, the second portion 73bb that is arranged side by side with the suction port 83, and the third portion 73bc that connects these portions. Further, the first portion 73ba and the second portion 73bb are arranged to be displaced from each other in the axial direction. When the pump body 100 is viewed in the radial direction, the third portion 73bc is extended between the suction port 81 and the suction port 83 in a direction different from the circumferential direction.

Therefore, the two suction ports 81, 83 can be located close to each other in the axial direction. Thus, it is possible to reduce the axial direction length of the pump body 100, and it is possible to achieve a size reduction of the rotary pump device.

Further, in the present embodiment, when the pump body 100 is viewed in the radial direction, the third portion 73bc is extended diagonally between the suction port 81 and the suction port 83. Therefore, it is possible to easily shorten the third portion 73bc, as compared to a case in which a portion of the third portion 73bc is arranged to be perpendicular to the circumferential direction and this perpendicular portion is extended between the suction port 81 and the suction port 83.

As a result, this can contribute to reduction of material that is necessary to form the annular seal member 73b.

Second Embodiment

A second embodiment of the present invention will be explained. In the present embodiment, the seal structure of the rotary pump device according to the first embodiment is changed. Structures other than the seal structure are the same as those of the first embodiment and only portions different from those of the first embodiment will be explained.

Figure 8:
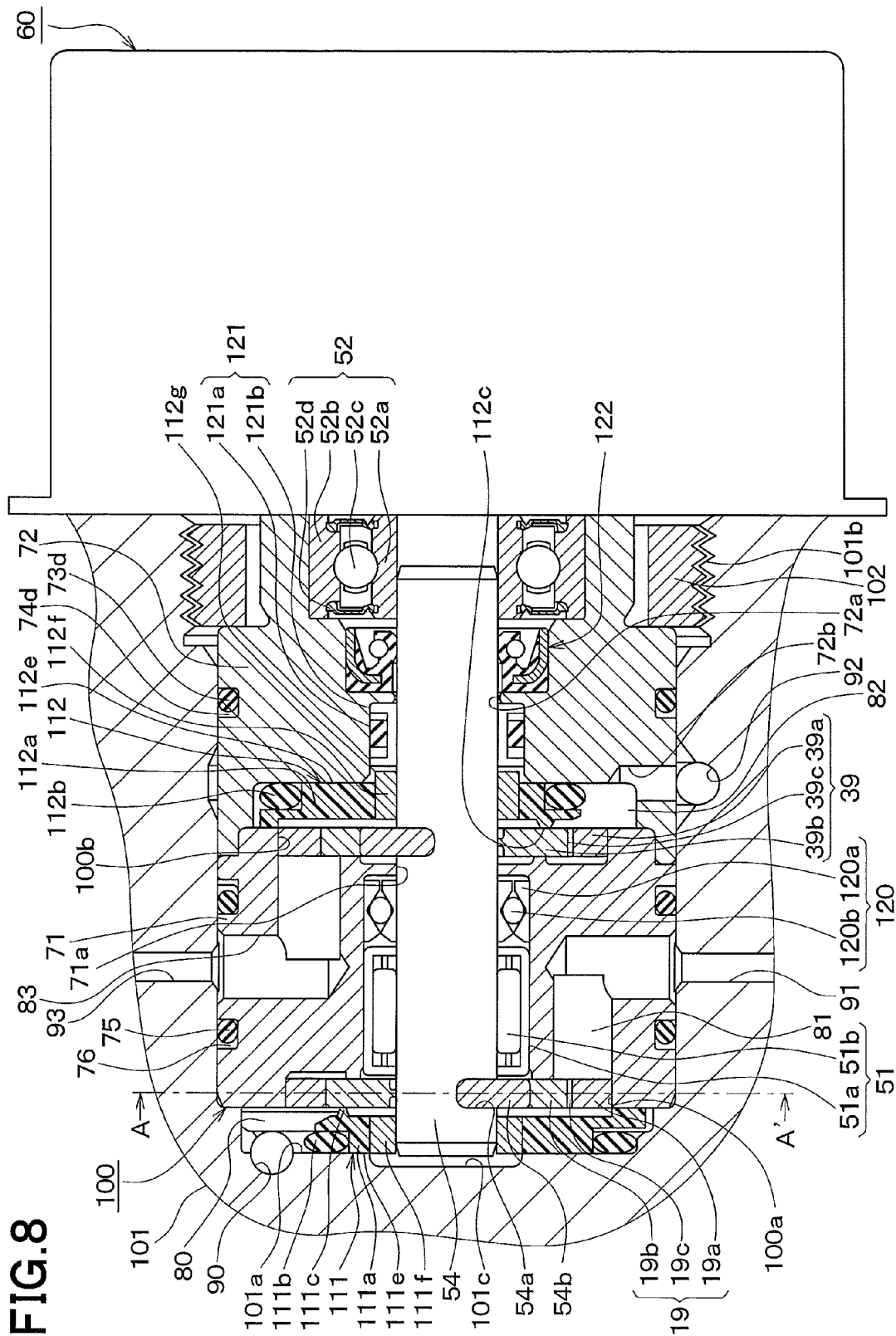
FIG. 8 is a cross-sectional diagram of a rotary pump device according to a second embodiment of the present invention.
Figure 9:
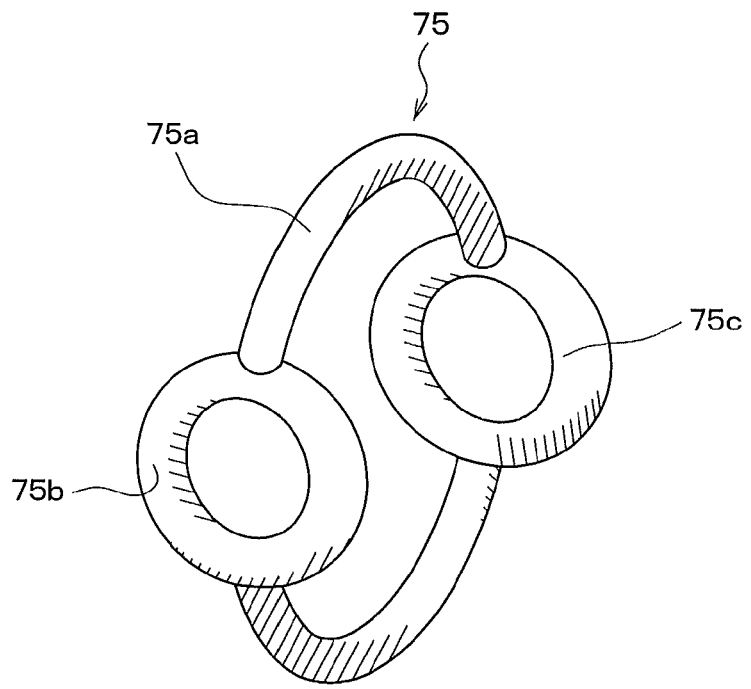
FIG. 9 is a perspective diagram of an annular seal member 75.

FIG. 8 is a cross-sectional diagram of a rotary pump device according to the present embodiment. As shown in FIG. 8, in the present embodiment, the O-rings 73a to 73c and the groove portions 74a to 74c that are provided in the rotary pump device of the first embodiment are formed by a single annular seal member 75 and a groove portion 76. FIG. 9 is an enlarged perspective diagram of the annular seal member 75. As shown in FIG. 9, in the annular seal member 75, a first through hole 75b and a second through hole 75c are provided for a ring portion 75a. The first and the second through holes 75b, 75c are arranged to be displaced from each other in the circumferential direction. The first through hole 75b allows the suction port 81 to be communicated with the suction conduit 91 in a fluid-tight manner, and the second through hole 75c allows the suction port 83 to be communicated with the suction conduit 93 in a fluid-tight manner. Further, the groove portion 76 shown in FIG. 8 has a shape that corresponds to the annular seal member 75. A portion corresponding to the first through hole 75b is formed to surround the suction port 81, and a portion corresponding to the second through hole 74c is formed to surround the suction port 83.

With this type of structure, the annular seal member 75 forms a seal between the two systems provided in the vehicle brake device by means of the whole annular seal member 75 and demarcates the two systems, while it forms a seal between the respective portions. More specifically, a part of the annular seal member 75 corresponding to the first through hole 75b is used to form a seal between the discharge path side including the high-pressure discharge port 80 and the discharge conduit 90 and the suction path side including the low-pressure suction port 81 and the suction conduit 91. Further, a part of the annular seal member 75 corresponding to the second through hole 75c is used to form a seal between the discharge path side including the high-pressure discharge port 82 and the discharge conduit 92 and the suction path side including the low-pressure suction port 83 and the suction conduit 93.

Since the annular seal member 75 that is provided with the first and the second through holes 75b, 75c is used in this manner, the suction ports 81, 83 for the two systems can be located closer to each other in the axial direction. In addition, it is possible to achieve a size reduction of the rotary pump device in the axial direction. Moreover, with the use of the single annular seal member 75 only, it is possible to demarcate an annular gap between the pump body 100 and the housing 101, to demarcate between one of the demarcated areas, and the suction port 81 and the suction conduit 91 that form the suction path of one of the two systems, and further to demarcate between the other of the demarcated areas, and the suction port 83 and the suction conduit 93 that form the suction path of the other system. Thus, with the use of the single annular seal member 75 only, it is possible to demarcate between the two systems and to demarcate between the suction path and the discharge path of each of the two systems.

Other Embodiments

In the above-described first embodiment, the arrangement is used as an example in which the suction port 81 and the suction port 83 for the two systems are displaced from each other in the axial direction. However, the suction port 81 and the suction port 83 may be arranged such that they are aligned in the axial direction without displacement.

In the first embodiment, a case is described as an example in which, when the pump body 100 is viewed in the radial direction, the third portion 73bc of the O-ring 73b extends diagonally with respect to the circumferential direction between the suction port 81 corresponding to a first opening and the suction port 83 corresponding to a second opening. However, the present invention is not limited to this example. For example, a part of the third portion 73bc may be arranged to be perpendicular to the circumferential direction and this perpendicular part may be extended between the suction port 81 and the suction port 83.

Figure 10:
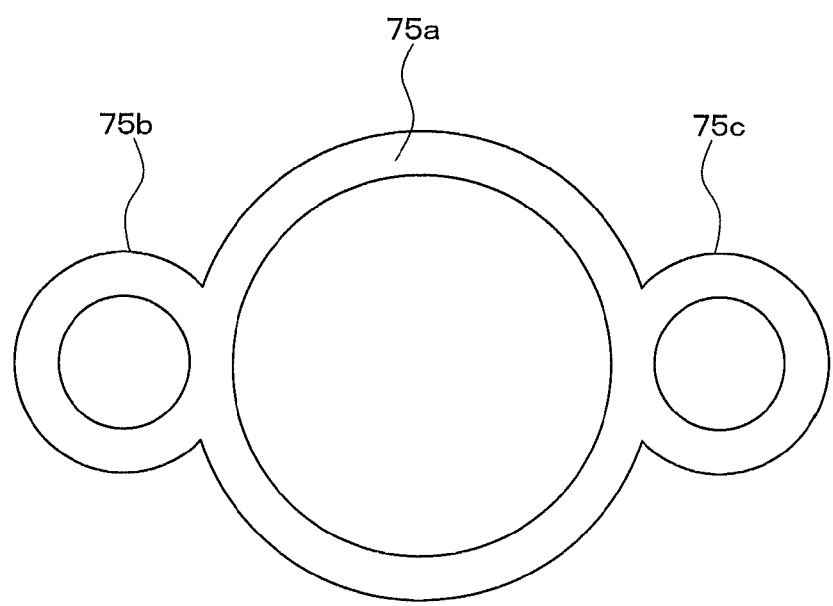
FIG. 10 is a perspective diagram of the annular seal member 75 that is explained in another embodiment.

Further, in the above-described second embodiment, the respective openings of the ring portion 75a and the first and the second through holes 75b, 75c of the annular seal member 75 face in different directions. However, another structure may be adopted. FIG. 10 is a perspective diagram of the annular seal member 75 in another form. As shown in FIG. 10, all the respective openings of the ring portion 75a and the first and the second through holes 75b, 75c may face a same direction. With this type of structure, it is possible to simplify the structure of the annular seal member 75 and a die for forming the annular seal member 75.

Note that, when the annular seam member 75 structured in this way is used, the shape of the groove portion 76 may be matched with the shape of the annular seal member 75. In addition, when the annular seal member 75 is assembled into the pump body 100, portions corresponding to the first and second through holes 75b, 75c may be folded at a base end portion (a portion connected with the ring portion 75a) and fitted into the groove portion 76.

Note that, in each of the above-described embodiments, the pump body 100 and the housing 101 are used as examples of a seal target member, and the rotary pump device is used as an explanatory example, which includes the suction port 81 as the first opening, the suction port 83 as the second opening, the suction conduit 91 as a third opening, and the suction conduit 93 as a fourth opening. However, the rotary pump device is used just as an example of a fluid machine, and the present invention may be applied to a fluid machine having another structure, as long as it adopts a structure in which an annular seal member is arranged in a groove portion that is formed in an outer peripheral surface of a cylinder-shaped seal target member.

The invention claimed is:

1. A fluid machine comprising:
a seal target member which includes a first opening and a second opening and which has a cylinder shape, one direction of which is an axial direction; and
an annular seal member which is arranged in a groove portion formed in an outer peripheral surface of the seal target member, and which forms a seal between the first opening and the second opening on the outer peripheral surface of the seal target member,
wherein
the first opening and the second opening are arranged to be displaced from each other in the axial direction and a circumferential direction of the seal target member,
the annular seal member includes a first portion that is arranged side by side with the first opening at the second-opening side of the first opening in the axial direction, a second portion that is arranged side by side with the second opening at the first-opening side of the second opening in the axial direction, and a third portion that connects the first portion and the second portion, the first portion and the second portion are displaced from each other in the axial direction, and the third portion extends between the first opening and the second opening in a direction that is not parallel to the axial direction or the circumferential direction when the seal target member is viewed in a radial direction.

2. The fluid machine according to claim 1, wherein the third portion extends diagonally with respect to the circumferential direction between the first opening and the second opening when the seal target member is viewed in the radial direction.

* * * * *